US012525021B2

(12) United States Patent
Honda et al.

(10) Patent No.: US 12,525,021 B2
(45) Date of Patent: Jan. 13, 2026

(54) DEVICE, VEHICLE, AND METHOD FOR MONITORING ABNORMAL SITUATION USING VEHICLE

(71) Applicant: TOYOTA JIDOSHA KABUSHIKI KAISHA, Toyota (JP)

(72) Inventors: Daisaku Honda, Nagoya (JP); Hiroya Matsubayashi, Nisshin (JP); Ryota Tomizawa, Mishima (JP); Satoshi Tanabe, Susono (JP); Nobutsugu Maruiwa, Mishima (JP); Yasuhiro Kobatake, Nagoya (JP); Hiroki Awano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 395 days.

(21) Appl. No.: 18/107,745

(22) Filed: Feb. 9, 2023

(65) Prior Publication Data
US 2023/0326214 A1    Oct. 12, 2023

(30) Foreign Application Priority Data

Apr. 11, 2022    (JP) .................................. 2022-065255

(51) Int. Cl.
*G08G 1/127*    (2006.01)
*G06T 7/70*    (2017.01)
(Continued)

(52) U.S. Cl.
CPC ................ *G06V 20/56* (2022.01); *G06T 7/70* (2017.01); *G06V 20/52* (2022.01); *G08G 1/127* (2013.01); *G06T 2207/30264* (2013.01)

(58) Field of Classification Search
CPC ........ G06V 20/56; G06V 20/52; G06V 20/54; G08B 25/00; G08B 21/00; G08B 17/125;
(Continued)

(56) References Cited

U.S. PATENT DOCUMENTS

2018/0268473 A1* 9/2018 Um ........................ H04L 41/022
2019/0347528 A1* 11/2019 Koyama ................ G08B 25/04
(Continued)

FOREIGN PATENT DOCUMENTS

| JP | 2019-16306 A | 1/2019 |
| JP | 2020-149088 A | 9/2020 |
| JP | 2021-140399 A | 9/2021 |

*Primary Examiner* — Aaron W Carter
*Assistant Examiner* — Kyla Guan-Ping Tiao Allen
(74) *Attorney, Agent, or Firm* — Sughrue Mion, PLLC

(57) ABSTRACT

A device that monitors an abnormal situation that has occurred in a region inside or around a parking lot using a vehicle in the region includes: an information acquisition unit that acquires state information representing a state within the region; an abnormality detection unit that detects the abnormal situation and specifies an occurrence location of the detected abnormal situation based on the state information; and a command transmission unit that transmits a command for activating a vehicle exterior monitoring sensor provided in the vehicle parked around the occurrence location specified by the abnormality detection unit and causing the vehicle exterior monitoring sensor to detect the occurrence location to the parked vehicle.

7 Claims, 7 Drawing Sheets

(51) Int. Cl.
*G06V 20/52* (2022.01)
*G06V 20/54* (2022.01)
*G06V 20/56* (2022.01)
*G08B 17/12* (2006.01)

(58) Field of Classification Search
CPC .. G06T 7/70; G06T 2207/30264; G08G 1/127
See application file for complete search history.

(56) References Cited

U.S. PATENT DOCUMENTS

| | | |
|---|---|---|
| 2020/0125856 A1 | 4/2020 | Miyano et al. |
| 2020/0258183 A1* | 8/2020 | Okamura ................. G08G 1/04 |
| 2021/0245711 A1* | 8/2021 | Nagata ................... H04N 7/181 |
| 2021/0281804 A1 | 9/2021 | Nakabayashi et al. |
| 2021/0331648 A1* | 10/2021 | Pham ...................... G01S 17/88 |

\* cited by examiner

DEVICE, VEHICLE, AND METHOD FOR MONITORING ABNORMAL SITUATION USING VEHICLE

CROSS-REFERENCE TO RELATED APPLICATION

This application claims priority to Japanese Patent Application No. 2022-065255 filed on Apr. 11, 2022, incorporated herein by reference in its entirety.

BACKGROUND

1. Technical Field

The present disclosure relates to a device, a vehicle, and a method for monitoring an abnormal situation using a vehicle.

2. Description of Related Art

A security device for a vehicle is known (for example, Japanese Unexamined Patent Application Publication No. 2020-149088 (JP 2020-149088 A)).

SUMMARY

Abnormal situations, such as fires, incidents or accidents, may occur in a parking lot or in a region around the parking lot. In the related art, there is a need to improve security in the region by effectively monitoring abnormal situations as described above.

A first aspect of the present disclosure is a device that monitors an abnormal situation that has occurred in a region inside or around a parking lot using a vehicle in the region and that includes: an information acquisition unit that acquires state information representing a state within the region; an abnormality detection unit that detects the abnormal situation and specifies an occurrence location of the detected abnormal situation based on the state information; and a command transmission unit that transmits a command for activating a vehicle exterior monitoring sensor provided in the vehicle parked around the occurrence location specified by the abnormality detection unit and causing the vehicle exterior monitoring sensor to detect the occurrence location to the parked vehicle.

A second aspect of the present disclosure is the device according to the first aspect. In the device, the information acquisition unit acquires, as the state information, image data captured by an infrastructure sensor provided in the parking lot, and the abnormality detection unit detects the abnormal situation and specifies the occurrence location based on the image data.

A third aspect of the present disclosure is the device according to the first or the second aspect. The device further includes a vehicle specification unit that specifies the parked vehicle of which the vehicle exterior monitoring sensor is to be activated from among the vehicles in the region based on the state information and position information of the vehicles in the region. The command transmission unit transmits the command to the parked vehicle specified by the vehicle specification unit.

A fourth aspect of the present disclosure is the device according to the third aspect. In the device, the vehicle specification unit specifies a parking position of the vehicle in the region based on the state information or the position information, and specifies the parked vehicle provided with the vehicle exterior monitoring sensor that captures the occurrence location within a detection range based on the specified parking position from among the vehicles within the region.

A fifth aspect of the present disclosure is the device according to the fourth aspect. In the device, the vehicle specification unit further specifies an orientation of the vehicle in the region based on the state information or the position information, and specifies the parked vehicle further based on the specified orientation.

A sixth aspect of the present disclosure is the device according to any one of the first to the fifth aspects. In the device, the information acquisition unit further acquires, as the state information, detection data detected by the vehicle exterior monitoring sensor in accordance with the command transmitted by the command transmission unit.

A seventh aspect of the present disclosure is a vehicle provided with a vehicle exterior monitoring sensor. In the vehicle, the vehicle exterior monitoring sensor is activated and is caused to detect the occurrence location in accordance with the command transmitted by the command transmission unit of the device according to any one of the first to the sixth aspects.

An eighth aspect of the present disclosure is a method for monitoring an abnormal situation that has occurred in a region inside or around a parking lot using a vehicle in the region, and includes: acquiring, by a processor, state information indicating a state within the region; detecting, by the processor, the abnormal situation and specifying an occurrence location of the detected abnormal situation based on the state information; and transmitting, by the processor, a command for activating a vehicle exterior monitoring sensor provided in the vehicle parked around the occurrence location specified and causing the vehicle exterior monitoring sensor to detect the occurrence location to the parked vehicle.

According to the present disclosure, it is possible to monitor the abnormal situation that has occurred within the region using the vehicle exterior monitoring sensors mounted on the surrounding vehicles. Therefore, the abnormal situation that has occurred can be effectively monitored, whereby the security in the region can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
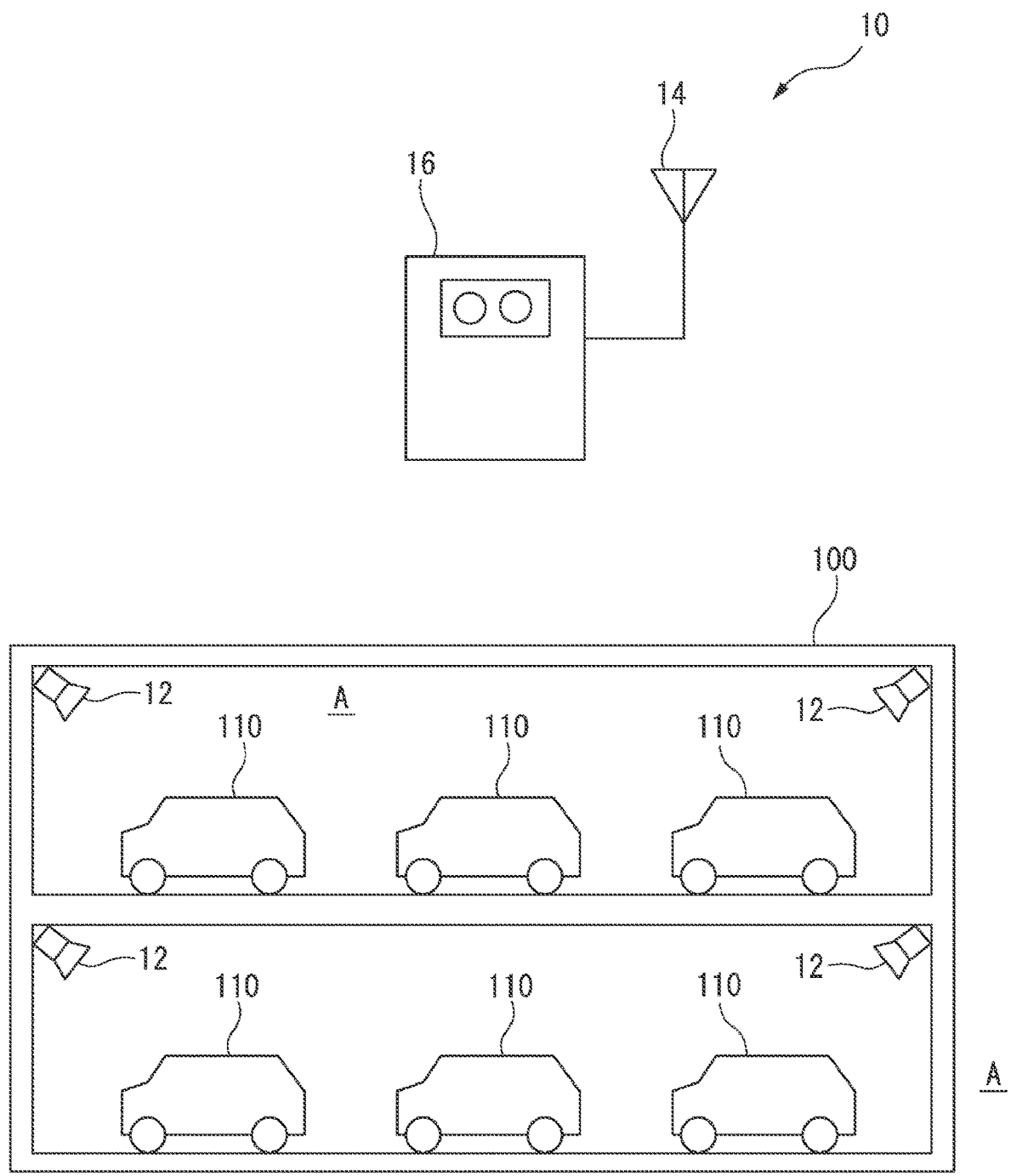
FIG. 1 is a diagram showing a configuration of a parking management system according to an embodiment.

Hereinafter, embodiments of the present disclosure will be described in detail based on the drawings. In the various embodiments described below, the same reference signs are given to the same elements, and redundant description thereof will be omitted. First, a parking management system 10 according to an embodiment will be described with reference to FIGS. 1 and 2. The parking management system 10 is a system for managing vehicles 110 parked in a parking lot 100 or in a region A around the parking lot 100.

The parking management system 10 includes a plurality of infrastructure sensors 12, a communication device 14, and a parking management server 16. Each of the infrastructure sensors 12 includes a camera or laser scanner or the like and is provided in the parking lot 100 to capture an image of the inside of the region A. Note that, the infrastructure sensors 12 are distributed and installed in multiple locations in the parking lot 100 such that images can be captured at any locations in the region A (for example, any parking frames defined in the parking lot 100). The infrastructure sensor 12 supplies image data ID of the imaged region A to the parking management server 16.

The communication device 14 is capable of data communication with an external device including the vehicles 110 in the region A. Specifically, the communication device 14 wirelessly transmits and receives data to and from the external device using, for example, a mobile communication network system such as the fourth generation (4G) or the fifth generation (5G). Note that, a plurality of the communication devices 14 may be provided in the parking lot 100 such that communication with the vehicle 110 parked in each parking frame in the region A is allowed. Further, the communication device 14 may also communicate with an external device in any communication protocol.

Figure 2:
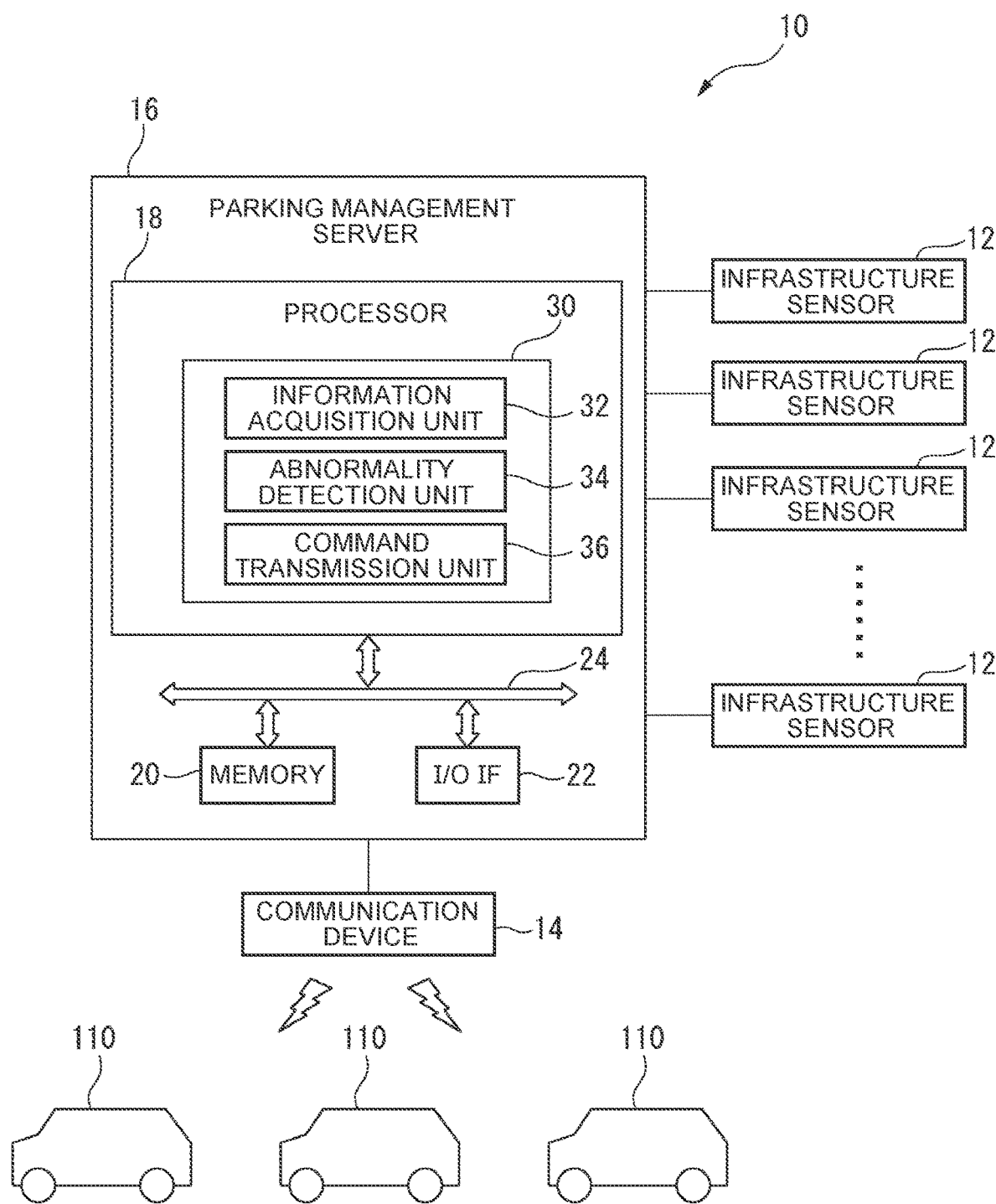
FIG. 2 is a block diagram showing the parking management system shown in FIG. 1.

The parking management server 16 controls operations of the infrastructure sensors 12 and the communication device 14. Specifically, as shown in FIG. 2, the parking management server 16 is a computer provided with a processor 18, a memory 20, and an input/output (I/O) interface 22. The processor 18 includes a central processing unit (CPU) or a graphics processing unit (GPU), and is communicatively connected to the memory 20 and the I/O interface 22 via a bus 24. The processor 18 performs arithmetic processing for realizing an abnormal situation monitoring function to be described later.

The memory 20 includes a random access memory (RAM), a read-only memory (ROM), or the like, and temporarily or permanently stores various types of data used in the arithmetic processing executed by the processor 18, and various types of data generated in the middle of the arithmetic processing. The I/O interface 22 includes, for example, an Ethernet (registered trademark) port, a universal serial bus (USB) port, or a high-definition multimedia interface (HDMI) (registered trademark) terminal. In addition to the infrastructure sensors 12 and the communication device 14 described above, peripheral devices such as a display (liquid crystal display (LCD), organic electroluminescence (EL) display, etc.), an input device (keyboard, mouse, etc.), and a speaker are communicatively connected to the I/O interface 22 by wire or wirelessly.

Figure 3:
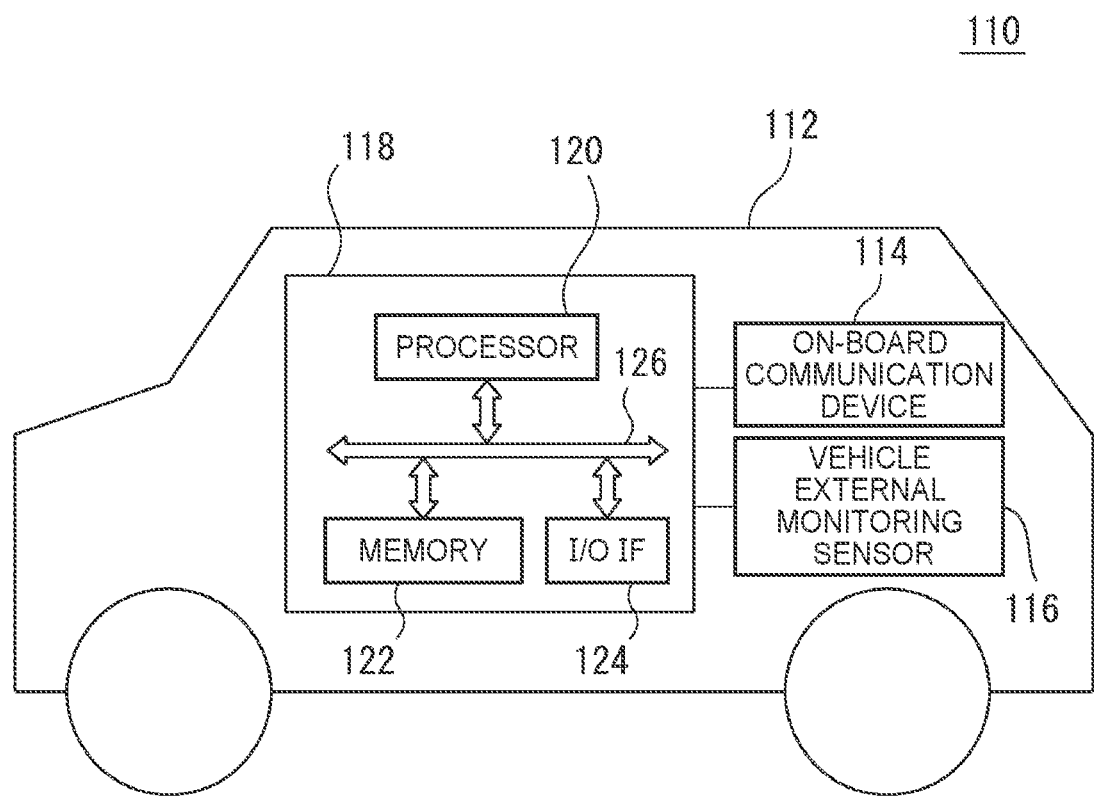
FIG. 3 is a block diagram of a vehicle according to the embodiment.

A plurality of the vehicles 110 can be parked within the region A (for example, inside parking lot 100). Hereinafter, with reference to FIG. 3, a configuration of each vehicle 110 according to the embodiment will be described. The vehicle 110 is, for example, a four-wheel vehicle, and includes a vehicle body 112, an on-board communication device 114, a vehicle exterior monitoring sensor 116, an electronic control unit (ECU) 118, and the like.

In addition to the on-board communication device 114, the vehicle exterior monitoring sensor 116, and the ECU 118, the vehicle body 112 includes, for example, various on-board components such as a drive mechanism (engine, electric motor, etc.), a steering mechanism (power steering device, etc.), a braking mechanism (electric brake device, etc.), and various sensors (speed sensor, steering angle sensor, etc.).

The on-board communication device 114 can communicate with the external device such as the communication device 14 of the parking management system 10. The on-board communication device 114 includes, for example, a global positioning system (GPS) receiver 114A, an inter-vehicle communication device 114B, and a data communication module (DCM) 114C. The GPS receiver 114A receives GPS signals from GPS satellites. The inter-vehicle communication device 114B can transmit and receive data to and from the on-board communication device of another vehicle. The DCM 114C can use a mobile communication network system such as 4G or 5G to transmit and receive data to and from the communication device 14 described above, the management server of the automobile company that manufactures the vehicle 110, or the base station of the communication carrier.

The vehicle exterior monitoring sensor 116 detects the surrounding environment of the vehicle 110. For example, the vehicle exterior monitoring sensor 116 includes at least one of a camera that detects the surrounding environment by capturing an image of the surrounding environment of the vehicle 110, and a radar (light detection and ranging (LiDAR, laser scanner, or the like) that detects the surrounding environment by irradiating an electromagnetic wave (for example, a laser beam) to the surroundings of the vehicle 110 and receiving the reflected waves from the surrounding environment.

The ECU 118 controls the operation of the vehicle 110. Specifically, the ECU 118 is a computer provided with a processor 120, a memory 122, and an I/O interface 124. The processor 120 includes a CPU or a GPU, and is communicatively connected to the memory 122 and the I/O interface 124 via a bus 126.

The memory 122 includes a RAM, a ROM, or the like, and temporarily or permanently stores various types of data used in the arithmetic processing executed by the processor 120, and various types of data generated in the middle of the arithmetic processing. The I/O interface 124 includes, for example, a controller area network (CAN) port, an Ethernet (registered trademark) port, a USB port, an optical fiber connector, or an HDMI (registered trademark) terminal, and performs wired or wireless communication of data with on-board components such as the on-board communication device 114 and the vehicle exterior monitoring sensor 116.

In the present embodiment, an owner D of each vehicle 110 makes a user registration of the parking lot 100 in advance to use the parking lot 100. For example, the owner D operates a human machine interface (HMI) of the vehicle 110, accesses the parking management server 16 through the on-board communication device 114 of the vehicle 110, downloads an application a for making the user registration of the parking lot 100 from the parking management server 16, and installs the application a onto the ECU 118 of the vehicle 110.

Then, the owner D starts the application a by operating the HMI of the vehicle 110, inputs personal information Iv (name, address, telephone number, etc.) of the owner D and specification information Is for specifying the vehicle 110 through a user registration screen displayed on the display of the HMI, and uploads the input data to the parking management server 16 through the on-board communication device 114.

The specification information Is includes, for example, an automobile registration number Is1 and a chassis number Is2 of the vehicle 110, and an automobile company Is3 that is the manufacturer of the vehicle 110, and a vehicle model Is4 of the vehicle 110. Among the items of the specification information Is, the automobile registration number Is1 is printed on each of license plates attached to the front and rear of the vehicle 110 so as to be visible from the outside of the vehicle 110.

The processor 18 of the parking management server 16 acquires the personal information Iv and the specification information Is transmitted from the on-board communication device 114 of the vehicle 110 through the communication device 14, and acquires a communication address AD assigned to the on-board communication device 114 (e.g., IP address). Then, the processor 18 creates a database DB in which the acquired personal information Iv, the specification information Is, and the address AD are stored in association with each other, and stores the database DB in the memory 20 in advance. Thus, prior to use of the parking lot 100, the specification information Is and the addresses AD of the vehicles 110 are stored in the database DB.

Here, an abnormal situation AS may occur in the region A. As such an abnormal situation AS, for example, a fire AS1, an incident AS2 such as theft of the vehicle 110, and an accident AS3 between vehicles 110 may occur. In the present embodiment, the parking management server 16 detects the occurrence of the abnormal situation AS as described above, and executes the function to monitor the abnormal situation AS using the vehicle 110 in the region A.

Figure 4:
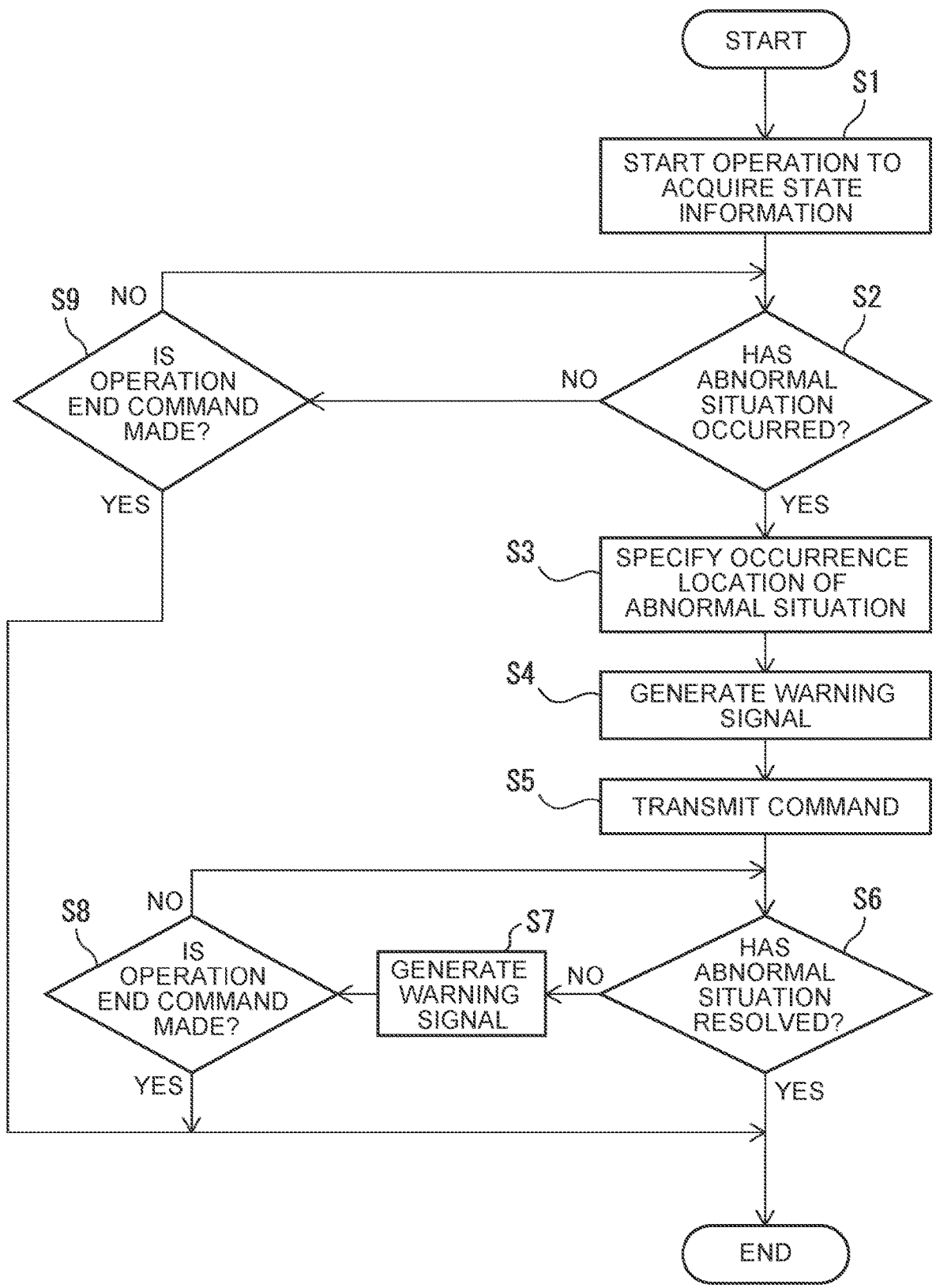
FIG. 4 is a flowchart showing an example method for monitoring an abnormal situation.

A method for monitoring the abnormal situation AS will be described below with reference to FIG. 4. The flow shown in FIG. 4 is started when the processor 18 of the parking management server 16 receives an operation start command (for example, a power ON command) from an operator, a host controller, or a computer program PG.

In step S1, the processor 18 starts the operation to acquire state information Ia representing the state in the region A. As an example, the processor 18 acquires the image data ID captured by the infrastructure sensor 12 as the state information Ia. More specifically, each infrastructure sensor 12 continuously (e.g., periodically) captures images of the inside of the region A (e.g., the inside of the parking lot 100).

The processor 18 continuously (for example, periodically) acquires the image data ID captured by each infrastructure sensor 12 from the infrastructure sensor 12 through the I/O interface 22. As described above, the processor 18 starts collection of the image data ID captured by the infrastructure sensors 12 as the state information Ia.

As another example, the processor 18 acquires message data MD reporting the state within the region A as the state information Ia. The message data MD includes, for example, text data or image data of articles posted on social media or websites (webpage run by the management company of the parking lot 100, personal blog, news website, etc.).

For example, when a user of the parking lot 100 witnesses the abnormal situation AS that has occurred in the region A, the user operates a mobile device (for example, a smartphone, a tablet terminal device, or the like) owned by the user to post the message data MD reporting the occurrence of the abnormal situation AS on the social media or the website. As described above, the message data MD reports the state within the region A using the text data or the image data.

On the other hand, the I/O interface 22 of the parking management server 16 is communicably connected to a communication network NW (LAN, Internet, etc.), and the processor 18 can access the social media or the website through the communication network NW. The processor 18 accesses the social media or the website through the communication network NW, and searches for and collects the message data MD reporting the state within the region A.

As described above, the processor 18 starts the operation to acquire the state information Ia (for example, the image data ID and the message data MD) in step S1. Therefore, in the present embodiment, the processor 18 functions as an information acquisition unit 32 (FIG. 2) that acquires the state information Ia.

Here, in the present embodiment, the processor 18 specifies the vehicle 110 that has entered the region A (for example, the inside of the parking lot 100) based on the acquired state information Ia, and specifies a parking position PP of the vehicle 110. Specifically, the infrastructure sensor 12 continuously captures images of each vehicle 110 that has entered the region A. After the start of step S1, the processor 18 collects the image data ID of the vehicle 110 captured by the infrastructure sensor 12 as the state information Ia.

Figure 5:
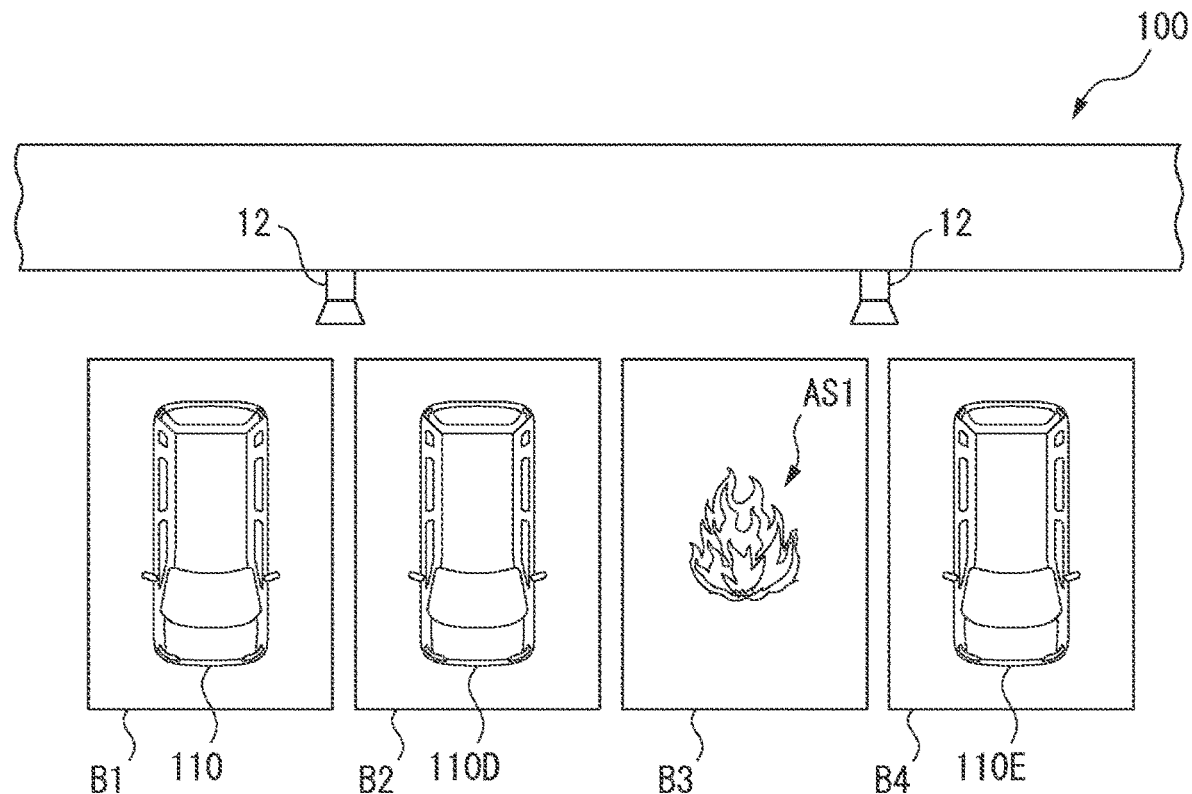
FIG. 5 shows an example in which the abnormal situation has occurred inside a parking lot.
Figure 5:
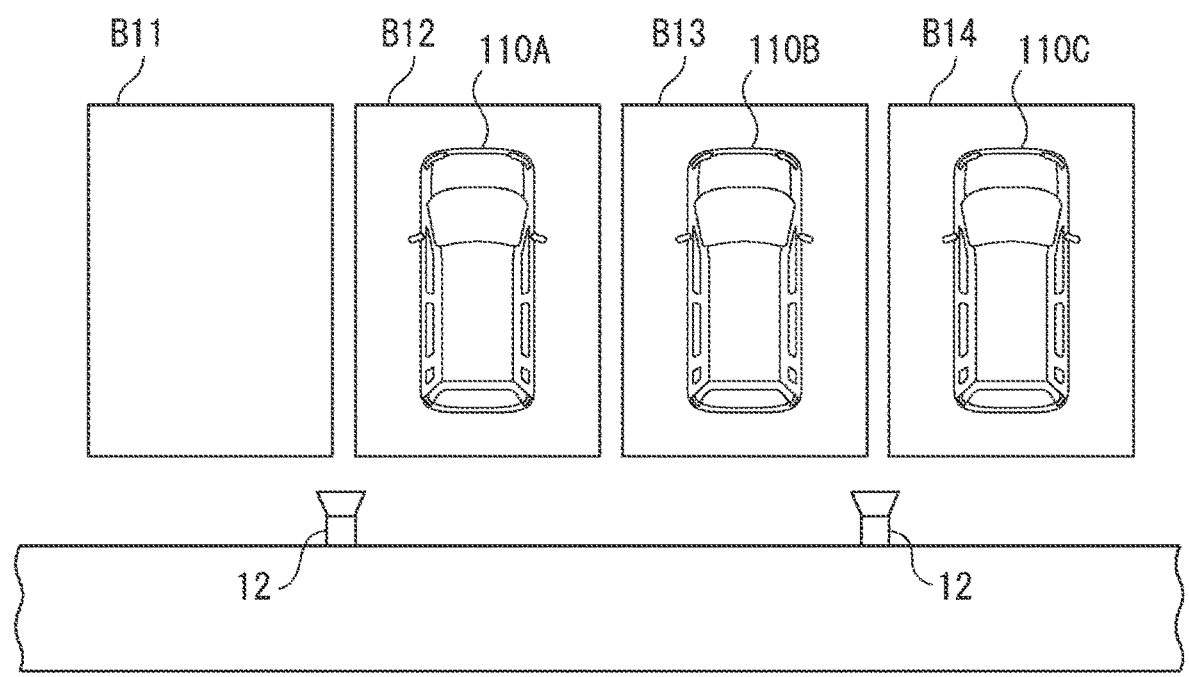

For example, it is assumed that a vehicle 110E shown in FIG. 5 has entered the inside the parking lot 100. In this case, the processor 18 reads the automobile registration number $Is1_{110E}$ included in the image data ID, out of the specification information $Is_{110E}$ of the vehicle 110E, by performing the image analysis of the image data ID of the vehicle 110E captured by the infrastructure sensor 12.

The processor 18 specifies the vehicle 110E stored in the database DB by comparing the read automobile registration number $IS1_{110E}$ with the automobile registration numbers Is1 of the vehicles 110 stored in the database DB. Note that, the processor 18 may specify the automobile company $Is3_{110E}$ and the vehicle model $Is4_{110E}$ of the vehicle 110E from the image data ID of the vehicle 110E, and may specify the vehicle 110E in the database DB based on the automobile company $Is3110_E$ and the model $Is4_{110E}$.

Further, the processor 18 specifies which parking position PP (a parking frame B4 in the example shown in FIG. 5) in the region A the vehicle 110E is parked based on the image data ID of the vehicle 110E captured by the infrastructure sensor 12 after the entry of the vehicle 110E. As described above, the processor 18 can specify which vehicle 110 stored in the database DB is the vehicle 110 that has entered the region A, and can also specify the parking position PP of the vehicle 110. With the above, the processor 18 can acquire the address AD of each vehicle 110 in the region A from the database DB.

Note that, the processor 18 may specify the parking position PP of the vehicle 110 in the region A based on position information Ip of the vehicle 110. Specifically, the processor 120 of the vehicle 110 estimates the position of the vehicle 110 based on the GPS signals received from the GPS satellites through the GPS receiver 114A and map data MP stored in memory 122 in advance.

After the vehicle 110 enters the region A (for example, inside the parking lot 100), the processor 120 transmits the estimated position of the vehicle 110 as the position information Ip to the parking management system 10 through the on-board communication device 114 (for example, the DCM 114C). The processor 18 of the parking management server 16 specifies the parking position PP of the vehicle 110 based on the position information Ip received by the communication device 14 from the on-board communication device 114.

Note that, the processor 120 of the vehicle 110 may transmit, along with the position information Ip (that is, the vehicle position), behavior information Ib of the vehicle 110 after the vehicle 110 enters the parking lot 100 (for example, the speed, the acceleration, and the steering angle of the steering wheel of the vehicle 110). Then, the processor 18 of the parking management server 16 may specify the parking position PP of the vehicle 110 based on the position information Ip and the behavior information Ib. In this case, the processor 18 can specify the parking position PP of the vehicle 110 in the region A more accurately.

Further, when the processor 18 of the parking management server 16 receives the position information Ip (and the behavior information Ib) from the on-board communication device 114, the processor 18 may acquire the specification information Is (for example, the automobile registration number Is1) of the vehicle 110, or the address AD of the on-board communication device 114. Then, the processor 18 may specify which vehicle 110 stored in the database DB is the vehicle 110 that has transmitted the position information Ip by comparing the acquired specification information Is of the vehicle 110 or the address AD with the specification information Is or the addresses AD of the vehicles 110 stored in the database DB.

In this case, the processor 18 specifies the vehicle 110 that has entered the region A without using the state information Ia (that is, the image data ID of the vehicle 110 captured by the infrastructure sensor 12), and can specify the parking position PP of the vehicle 110. As described above, the processor 18 can specify the parking position PP of each vehicle 110 that has entered the region A and obtain the address AD of the vehicle 110.

In step S2, the processor 18 detects whether the abnormal situation AS has occurred based on the state information Ia. As an example of the abnormal situation AS, a case where the fire AS1 occurs inside the parking lot 100 as shown in FIG. 5 will be described below. In the example shown in FIG. 5, a plurality of parking frames Bn (n=1, 2, 3, 4, . . . 11, 12, 13, 14, . . . ) is defined inside the parking lot 100, and the fire AS1 occurs in the parking frame B3.

The fire AS1 as described above appears in the image data ID captured by the infrastructure sensor 12. Alternatively, the user of the parking lot 100 can operate his/her own mobile device to post the message data MD reporting the occurrence of the fire AS1 to the social media or the website. Therefore, the processor 18 can detect whether the fire AS1 has occurred by analyzing the image data ID and the message data MD collected after the start of step S1.

Note that, the processor 18 may detect whether the abnormal situation AS has occurred using a machine learning model LM (or algorithm of artificial intelligence: AI) that indicates a correlation between the state information Ia (that is, the image data ID and the message data MD) and whether the abnormal situation AS (in the present embodiment, the fire AS1) has occurred.

The machine learning model LM can be created by, for example, repeatedly feeding the state information Ia and determination data indicating whether the abnormal situation AS has occurred to a machine learning device as a learning data set (for example, supervised learning). Note that, the processor 18 may be configured to perform functions of the machine learning device and generate the machine learning model LM. The generated machine learning model LM may be stored in the memory 20 in advance.

The processor 18 inputs the state information Ia collected after the start of step S1 to the machine learning model LM. The machine learning model LM outputs determination result data indicating whether the abnormal situation AS (the fire AS1) has occurred from the input state information Ia. The processor 18 can detect whether the abnormal situation AS has occurred from the determination result data output by the machine learning model LM.

As described above, in the present embodiment, the processor 18 functions as an abnormality detection unit 34 (FIG. 2) that detects the abnormal situation AS (specifically, the fire AS1) that has occurred in the region A (for example, the inside of the parking lot 100) based on the state information Ia (specifically, the image data ID and the message data MD). The processor 18 determines YES when the occurrence of the abnormal situation AS is detected and proceeds to step S3. When the processor 18 determines NO, the processor 18 proceeds to step S9.

In step S3, the processor 18 functions as the abnormality detection unit 34 and specifies an occurrence location OL of the abnormal situation AS based on the state information Ia. As an example, when the occurrence of the fire AS1 is detected based on the image data ID in step S2, the processor 18 specifies the occurrence location OL of the fire AS1 inside the parking lot 100 based on the position of the infrastructure sensor 12 that captures the image data ID in which the fire AS1 is captured and the position of the image of the fire AS1 in the image data ID.

Alternatively, the processor 18 may specify the parking frame B3 where the fire AS1 is occurring from the image data ID in which the fire AS1 is captured, and specify the occurrence location OL of the fire AS1 as the parking frame B3. In this case, a sign (for example, a parking frame number) specifying the parking frame B3 may be provided on a building (for example, a wall or a roadway) inside the parking lot 100. Then, the processor 18 may specify the occurrence location OL of the fire AS1 as the parking frame B3 from the sign of the parking frame B3 appearing in the image data ID.

As another example, when the occurrence of the fire AS1 is detected based on the message data MD in step S2, the processor 18 specifies the occurrence location OL from position information If of the fire AS1 included in the message data MD. For example, the message data MD may include, for example, the coordinates in a map application such as Google Map (registered trademark), or keywords specifying the parking lot 100 and the parking frame B3, as the position information If of the fire AS1.

The processor 18 can specify the occurrence location OL of the fire AS1 from the position information If included in the message data MD. As described above, in step S3, the processor 18 functions as the abnormality detection unit 34 and specifies the occurrence location OL of the abnormal situation AS based on the state information Ia (that is, the image data ID or the message data MD).

In step S4, the processor 18 generates a warning signal AL1 that informs that the abnormal situation AS has occurred. For example, the processor 18 generates the warning signal AL1 indicating that the fire AS1 has occurred as the abnormal situation AS and indicating the occurrence location OL specified in step S3, and causes a display connected to the I/O interface 22 of the parking management server 16 to display the warning signal AL1 or output the warning signal AL1 through a speaker connected to the I/O interface 22 as audio.

Alternatively, the processor 18 may transmit the generated warning signal AL1 to an external device (for example, the server of the management company of the parking lot 100) through the communication device 14 or the communication network NW. As described above, the operator of the parking management server 16 (or the external device) can immediately recognize the occurrence of the abnormal situation AS and the occurrence location OL.

In step S5, the processor 18 transmits a detection command C1 to the vehicle 110 parked around the occurrence location OL specified in step S3. The detection command C1 is a command for activating the vehicle exterior monitoring sensor 116 of the vehicle 110 parked around the occurrence location OL and causing the vehicle exterior monitoring sensor 116 to detect the occurrence location OL.

In this step S5, the processor 18 acquires the address AD of the vehicle 110 parked around the occurrence location OL specified in step S3 from the database DB. As an example, the processor 18 may acquire the addresses AD of all the vehicles 110 parked in the region A (for example, inside the parking lot 100) as the vehicles 110 parked around the occurrence location OL (the parking frame B3 in the example of FIG. 5).

As another example, the processor 18 may acquire the addresses AD of all of the vehicles 110 parked on the floor of the parking lot 100 (for example, the second floor of the parking lot 100) where the occurrence location OL is located as the vehicles 110 parked around the occurrence location OL. As yet another example, the processor 18 may specify the vehicles 110A, 110B, 110C, 110D, and 110E (FIG. 5) parked around the occurrence location OL from among the vehicles 110 in the region A based on the state information Ia or the position information Ip as will be described later, and acquire the addresses AD of the specified vehicles 110A, 110B, 110C, 110D and 110E.

The processor 18 transmits the detection command C1 to the on-board communication device 114 of the vehicle 110 having the address AD with reference to the acquired address AD. As described above, in the present embodiment, the processor 18 functions as a command transmission unit 36 (FIG. 2) that transmits the detection command C1 to the vehicle 110 parked around the occurrence location OL specified in step S3.

On the other hand, when the processor 120 of the vehicle 110 receives the detection command C1 through the on-board communication device 114, the processor 120 activates the vehicle exterior monitoring sensor 116 in accordance with the detection command C1. The vehicle exterior monitoring sensor 116 continuously (for example, periodically) detects the surrounding environment of the vehicle 110. As a result, at least one of the vehicles 110 (for example, the vehicles 110A, 110B, 110C, 110D, and 110E shown in FIG. 5) that each activate the vehicle exterior monitoring sensor 116 can detect the occurrence location OL by the vehicle exterior monitoring sensor 116. Then, the processor 120 sequentially transmits detection data DD detected by the vehicle exterior monitoring sensor 116 (for example, the image data captured by the camera or the radar) to the parking management system 10 through the on-board communication device 114.

The detection command C1 may include information of a communication address AD' (for example, IP address) of the communication device 14 of the parking management system 10. In this case, the processor 120 can transmit the detection data DD from the on-board communication device 114 to the communication device 14 with reference to the address AD'.

The processor 18 of the parking management server 16 sequentially acquires the detection data DD as the state information Ia through the communication device 14. As described above, the processor 18 can further acquire the detection data DD as the operation to acquire the state information Ia started in step S1 described above, and continuously monitor the occurrence location OL based on the detection data DD.

In step S6, the processor 18 of the parking management server 16 determines whether the abnormal situation AS has been resolved based on the state information Ia. For example, the processor 18 analyzes the image data ID captured by the infrastructure sensor 12 after the determination as YES is made in step S2 and the detection data DD collected from the vehicle 110 as the state information Ia after step S5, and determines whether the fire AS1 detected in step S2 has been extinguished.

Alternatively, the processor 18 may determine whether the fire AS1 has been extinguished by analyzing the message data MD collected after the determination as YES is made in step S2. At this time, the processor 18 may detect whether the fire AS1 has been extinguished by inputting the state information Ia (the image data ID, the detection data DD, or the message data MD) into the machine learning model LM.

Thus, the processor 18 determines whether the abnormal situation AS has been resolved (in the present embodiment, the fire AS1 has been extinguished) based on the state information Ia. When the processor 18 determines that the abnormal situation AS has been resolved (that is, determines as YES), the flow shown in FIG. 4 ends. When the processor 18 determines that the abnormal situation AS has not been resolved (that is, determines as NO), the process proceeds to S7.

In step S7, the processor 18 generates a warning signal AL2 that informs that the abnormal situation AS continues. For example, the processor 18 generates the warning signal AL2 and outputs the warning signal AL2 through a display or a speaker of the parking management server 16. Alternatively, the processor 18 may transmit the generated warning signal AL2 to an external device (for example, the server of the management company of the parking lot 100) through the communication device 14 or the communication network NW.

In step S8, the processor 18 determines whether an operation end command (for example, a shutdown command) has been received from the operator, the host controller, or the computer program PG. When the processor 18 has received the operation end command, the processor 18 determines YES and terminates the flow shown in FIG. 4. When the processor 18 determines NO, the process returns to step S6.

As described above, the processor 18 repeatedly executes the loop of steps S6 to S8 until YES is determined in step S6 or S8, and continuously monitors the abnormal situation AS (the fire AS1) based on the state information Ia (the image data ID, the detection data DD, the message data MD).

On the other hand, when NO is determined in step S2, in step S9, the processor 18 determines whether the operation end command has been received, as in step S8 described above. When the processor 18 determines YES, the processor 18 terminates the flow shown in FIG. 4. When the processor 18 determines NO, the process returns to step S2.

As described above, in the present embodiment, the processor 18 functions as the information acquisition unit 32, the abnormality detection unit 34, and the command transmission unit 36, detects the abnormal situation AS, and causes the vehicle exterior monitoring sensor 116 of the vehicle 110 to detect the occurrence location OL of the abnormal situation AS in accordance with the detection command C1, thereby monitoring the abnormal situation AS. Therefore, the information acquisition unit 32, the abnormality detection unit 34, and the command transmission unit 36 configure a device 30 (FIG. 2) that monitors the abnormal situation AS that has occurred in the region A using the vehicles 110 in the region A.

In the device 30, the information acquisition unit 32 acquires the state information Ia representing the state within the region A (step S1), and the abnormality detection unit 34 detects the abnormal situation AS based on the state information Ia (step S2) and specifies the occurrence location OL of the detected abnormal situation AS (step S3).

Then, the command transmission unit 36 transmits, to the vehicle 110 parked around the occurrence location OL specified by the abnormality detection unit 34, the detection command C1 for activating the vehicle exterior monitoring sensor 116 provided in the parked vehicle 110 and causing the vehicle exterior monitoring sensor 116 to detect the occurrence location OL (step S5).

According to this configuration, the abnormal situation AS (for example, the fire AS1) occurring in the region A can be monitored using the vehicle exterior monitoring sensor 116 mounted on the surrounding vehicle 110. Therefore, the abnormal situation AS that has occurred can be effectively monitored, whereby the security in the region A can be improved.

Further, in the device 30, the information acquisition unit 32 acquires, as the state information Ia, the image data ID captured by the infrastructure sensor 12 provided in the parking lot 100, and the abnormality detection unit 34 detects the abnormal situation AS and specifies the occurrence location OL of the abnormal situation AS, based on the image data ID. According to this configuration, the abnormal situation AS and the occurrence location OL can be detected with higher accuracy.

Further, in the device 30, the information acquisition unit 32 further acquires, as the state information Ia, the detection data DD detected by the vehicle exterior monitoring sensor 116 in accordance with the detection command C1 transmitted by the command transmission unit 36. According to this configuration, the processor 18 can continuously monitor the abnormal situation AS using the detection data DD.

In the present embodiment, the vehicle 110 parked around the occurrence location OL of the abnormal situation AS activates the vehicle exterior monitoring sensor 116 in accordance with the detection command C1 transmitted by the command transmission unit 36 of the device 30, and causes the vehicle exterior monitoring sensor 116 to detect the occurrence location OL. According to the vehicle 110 above, the abnormal situation AS can be more effectively monitored by the vehicle exterior monitoring sensor 116.

Figure 6:
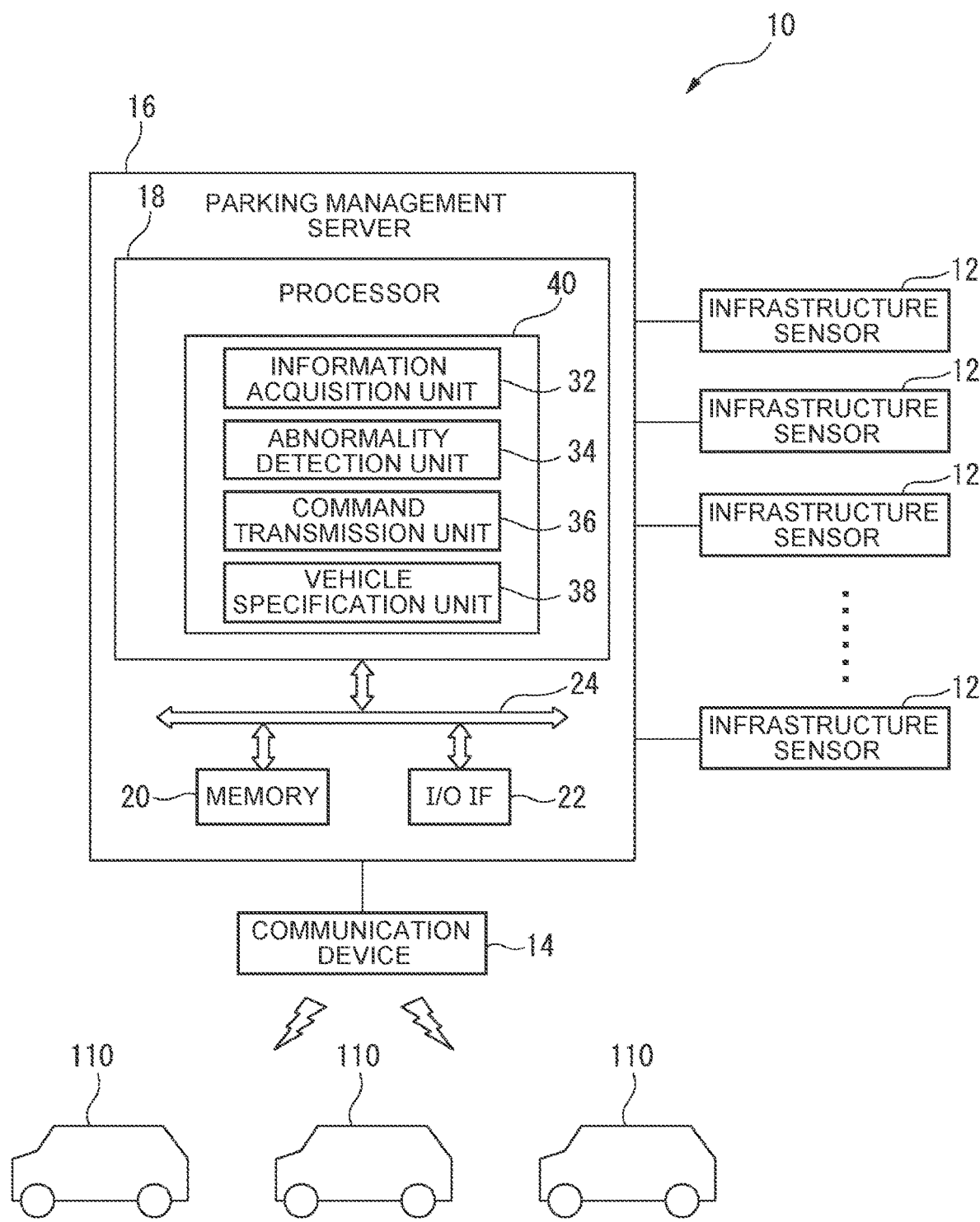
FIG. 6 is a block diagram of a parking management system according to another embodiment.

Next, other functions of the parking management system 10 will be described with reference to FIGS. 6 and 7. In the present embodiment, the processor 18 of the parking management server 16 executes the flow of an abnormal situation monitoring method shown in FIG. 7. The same or similar process as or to the flow shown in FIG. 5 in the flow shown in FIG. 7 is denoted by the same step number, and redundant description will be omitted.

Figure 7:
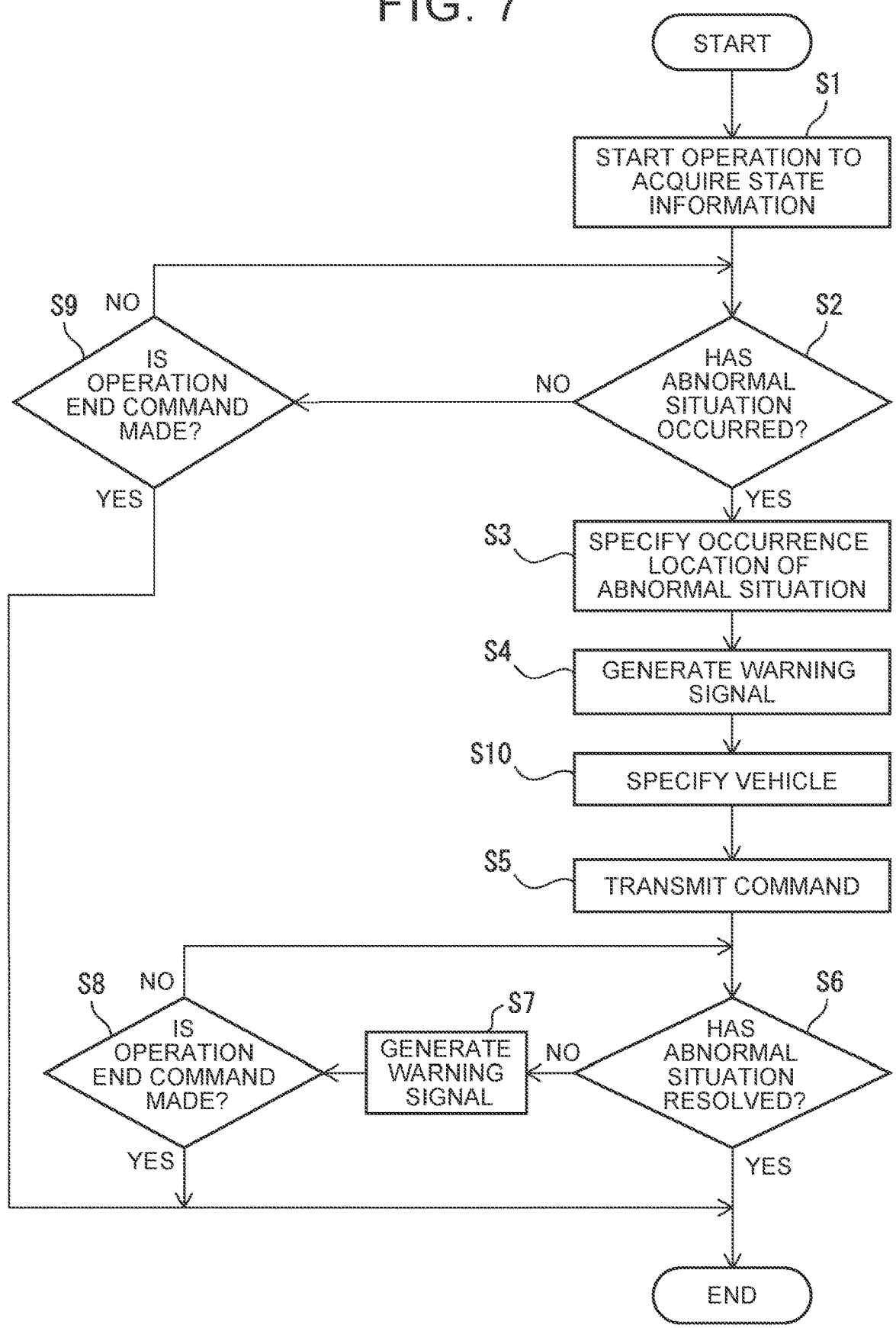
FIG. 7 is a flowchart showing another example of a method for monitoring the abnormal situation.

In the flow shown in FIG. 7, the processor 18 executes step S10 after step S4. In this step S10, the processor 18 specifies the vehicles 110A, 110B, 110C, 110D and 110E of which the vehicle exterior monitoring sensors 116 are to be activated from among the vehicles 110 in the region A based on the state information Ia (specifically, the image data ID of the vehicles 110) or the position information Ip of the vehicles 110 in the region A.

As described above, the processor 18 can specify the parking position PP of each vehicle 110 that has entered the region A (for example, inside the parking lot 100) based on the image data ID of the vehicle 110 captured by the infrastructure sensor 12 or the position information Ip of the vehicle 110. The processor 18 specifies the vehicles 110A, 1101B, 110C, 110D and 110E each provided with the vehicle exterior monitoring sensor 116 that captures the occurrence location OL of the abnormal situation AS (the fire AS1) within the detection range DR from among the vehicles 110 in the region A based on the parking position PP of each of the specified vehicles 110.

Here, the vehicle exterior monitoring sensor 116 of each vehicle 110 has the predetermined detection range DR. For example, when a single vehicle 110 is provided with a plurality of the vehicle exterior monitoring sensors 116, the detection range DR of the vehicle exterior monitoring sensors 116 can be the range (for example, a range of distance a [m] from the center of the vehicle 110) of the entire circumference of the vehicle 110 (that is, the front, the rear, right and left of the vehicle 110).

As an example, the information of the detection range DR of each vehicle 110 (for example, the distance a described above) is stored in the database DB in advance in association with the personal information Iv, the specification information Is, and the address AD. The processor 18 can acquire the detection range DR of each vehicle 110 from the database DB.

Alternatively, the processor 18 may acquire the information on the detection range DR of the vehicle 110 by referring to the specification information Is of the vehicle 110 (for example, the automobile company Is3 and the vehicle model Is4) and accessing the website of the automobile company Is3 of the vehicle 110 through the communication network NW.

The processor 18 can estimate the detection range DR of each vehicle 110 in the region A based on the specified parking position PP of the vehicle 110 and the information of the detection range DR of the vehicle 110 acquired from the database DB or the website. For example, in the example shown in FIG. 5, it is assumed that the occurrence location OL of the fire AS1 is within the detection ranges DR of the vehicles 110A, 110B, 110C, 110D and 110E parked around the occurrence location OL.

In this case, the processor 18 specifies the vehicles 110A, 110B, 110C, 110D, and 110E from among the vehicles 110 in the region A as the vehicles 110 provided with the vehicle exterior monitoring sensors 116 that each capture the occurrence location OL within the detection range DR based on the estimation result of the detection range DR.

Note that, the processor 18 may further specify an orientation cp of the vehicle 110 in the region A (specifically, the forward direction of the vehicle 110) based on the state information Ia or the position information Ip. For example, when a single vehicle 110 is provided with the vehicle exterior monitoring sensor 116 capable of monitoring only the front of the vehicle 110, the detection range DR can be the range in front of the vehicle 110 (the range in the distance δ (m) in front of the vehicle 110).

It is necessary to acquire the orientation φ of the vehicle 110 parked in the region A to estimate the detection range DR of the vehicle 110 described above in the region A. As an example, the processor 18 specifies the orientation φ of the vehicle 110 in the region A by analyzing the image data ID of the vehicle 110 captured by the infrastructure sensor 12 as the state information Ia.

As another example, the processor 18 may specify the orientation φ of the vehicle 110 in the region A based on the position information Ip (and the behavior information Ib) of the vehicle 110. Then, the processor 18 estimates the detection range DR of the vehicle 110 in the region A based on the specified parking position PP and orientation φ of the vehicle 110 and the information (the distance δ) of the detection range DR of the vehicle 110. The processor 18 may specify the vehicles 110A, 110B, 110C, 110D and 110E from the detection range DR estimated based on the parking position PP and orientation φ as described above.

Alternatively, the processor 18 may specify the vehicle 110 parked at the parking position PP within the range of a distance Δ (e.g., 5 (m)) from the occurrence location OL as the vehicle 110 of which vehicle exterior monitoring sensor 116 is to be activated. The distance Δ can be predetermined by the operator of the parking management server 16 in consideration of the detection range DR of the vehicle 110.

For example, in the example shown in FIG. 5, it is assumed that the vehicles 110A, 110B, 110C, 110D and 110E are parked within a range of the distance Δ from the occurrence location OL. In this case, the processor 18 specifies the vehicles 110A, 110B, 110C, 110D, and 110E as the vehicles 110 provided with the vehicle exterior monitoring sensors 116 that each capture the occurrence location OL within the detection range DR from among the vehicles 110 in the region A based on the occurrence location OL specified in step S3 above and the predetermined distance Δ.

As described above, the processor 18 specifies the parking positions PP of the vehicles 110 in the region A based on the state information Ia (specifically, the image data ID) or the position information Ip, and specifies the vehicles 110A, 110B, 110C, 110D, and 110E of which vehicle exterior monitoring sensors 116 are to be activated from among the vehicles 110 in the region A based on the specified parking positions PP. Therefore, in the present embodiment, the processor 18 functions as a vehicle specification unit 38 (FIG. 6) that specifies the vehicles 110A, 110B, 110C, 110D and 110E of which the vehicle exterior monitoring sensors 116 are to be activated.

After step S10, the processor 18 executes step S5, functions as the command transmission unit 36, and transmits the detection command C1 to the vehicles 110A, 110B, 110C, 110D and 110E specified in step S10. The processors 120 of the vehicles 110A, 110B, 110C, 110D and 110E activate their respective vehicle exterior monitoring sensors 116 to detect the occurrence location OL.

As described above, in the present embodiment, the processor 18 of the parking management server 16 functions as the information acquisition unit 32, the abnormality detection unit 34, the command transmission unit 36, and the vehicle specification unit 38, and monitors the abnormal situation AS using the vehicles 110A, 110B, 110C, 110D and 110E in the region A. Therefore, the information acquisition unit 32, the abnormality detection unit 34, the command transmission unit 36, and the vehicle specification unit 38 configure a device 40 (FIG. 6) that monitors the abnormal situation AS using the vehicle 110 in the region A.

In the device 40, the vehicle specification unit 38 specifies the vehicles 110A, 110B, 110C, 110D and 110E of which the vehicle exterior monitoring sensors 116 are to be activated from among the vehicles 110 in the region A based on the state information Ia (specifically, the image data ID of the vehicles 110) or the position information Ip of the vehicles 110 in the region A (step S10).

Then, the command transmission unit 36 transmits the detection command C1 to the vehicles 110A, 110B, 110C, 110D and 110E specified by the vehicle specification unit 38 (step S5). According to this configuration, the vehicles 110A, 110B, 110C, 110D, and 110E parked around the occurrence location OL are effectively selected, and the vehicle exterior monitoring sensors 116 of the vehicles 110A, 110B, 110C, 110D, and 110E can be activated. Therefore, the vehicle exterior monitoring sensors 116 of the vehicles 110A, 110B, 110C, 110D, and 110E can more effectively detect the occurrence location OL.

Further, in the device 40, the vehicle specification unit 38 specifies the parking positions PP of the vehicles 110 in the region A based on the state information Ia (the image data ID of the vehicle 110) or the position information Ip, and specifies the vehicles 110A, 110B, 110C, 110D, and 110E provided with the vehicle exterior monitoring sensors 116 that each capture the occurrence location OL within the detection range DR from among the vehicle 110 with in the region A based on the specified parking positions PP.

Further, the vehicle specification unit 38 further specifies the orientations φ of the vehicles 110 in the region A based on the state information Ia (the image data ID of the vehicles 110) or the position information Ip, and specifies the vehicles 110A, 110B, 110C, 110D and 110E based on the specified parking positions PP and orientations φ. According to this configuration, the vehicles 110A, 110B, 110C, 110D, and 110E that can reliably detect the occurrence locations OL can be effectively selected from among the vehicles 110 in the region A.

Note that, the processor 18 of the parking management server 16 may execute the flow shown in FIG. 4 or 7 in accordance with the computer program PG stored in the memory 20 in advance. Further, the functions of the device 30 or 40 (that is, the information acquisition unit 32, the abnormality detection unit 34, the command transmission unit 36, and the vehicle specification unit 38) executed by the processor 18 may be functional modules implemented by the computer program PG.

Although the flows in FIGS. 4 and 7 have been exemplified as a method for monitoring the abnormal situation AS, various modifications can be made to the flows in FIGS. 4 and 7. For example, in the above-described embodiment, the case where the processor 18 acquires the detection data DD from the vehicles 110 (or the vehicles 110A, 110B, 110C, 110D and 110E) as state information Ia after step S5 in FIG. 4 (or FIG. 7) has been described.

However, the present disclosure is not limited to this, and the processor 18 may not execute the operation to acquire the detection data DD from the vehicles 110 (or the vehicles 110A, 110B, 110C, 110D and 110E) as the state information Ia after step S5 in the flow shown in FIG. 4 (or FIG. 7). In this case, the processor 120 of the vehicle 110 (or the vehicles 110A, 110B, 110C, 110D and 110E) may operate the on-board communication device 114 and transmit the detection data DD detected by the vehicle exterior monitoring sensor 116 to an external device other than the parking management server 16.

For example, the processor 120 may operate the inter-vehicle communication device 114B and transmit the detection data DD to another vehicle, or may operate the DCM 114C and transmit the detection data DD to the management server of the automobile company or an external device such as a base station. With the above, the occurrence of the abnormal situation AS (the fire AS1) can be notified to the outside of the parking lot 100. Further, steps S6 to S8 may be omitted from the flow shown in FIG. 4 or 7. Moreover, in the flow shown in FIG. 4 or FIG. 7, when YES is determined in step S2, step S4 may be executed, and then step S3 may be executed.

Further, after step S5, when the detection data DD is detected by the vehicle exterior monitoring sensor 116 for a predetermined period of time, the processor 120 of the vehicle 110 (or the vehicles 110A, 110B, 110C, 110D and 110E) may cause the vehicle 110 (or the vehicles 110A, 110B, 110C, 110D and 110E) to evacuate to a safe parking position PP' that is away from the occurrence location OL of the abnormal situation AS (the fire AS1) by autonomous driving by automatically controlling the drive mechanism, the steering mechanism, and the braking mechanism.

In this case, the processor 18 of the parking management server 16 may determine an evacuation route for evacuating the vehicle 110 (or the vehicles 110A, 110B, 110C, 110D and 110E) based on the image data ID captured by the infrastructure sensor 12, and transmit an autonomous driving command for autonomously driving the vehicle 110 (or the vehicles 110A, 110B, 110C, 110D and 110E) to the vehicle 110 (or the vehicles 110A, 110B, 110C, 110D and 110E). As described above, various modifications can be made to the flow shown in FIG. 4 or FIG. 7.

In the example shown in FIG. 5, the case where the fire AS1 as the abnormal situation AS occurs inside the parking lot 100 (specifically, the parking frame B3) has been described. However, even when the incident AS2 or the accident AS3 occurs as the abnormal situation AS, or when the abnormal situation AS occurs around the parking lot 100, the processor 18 of the parking management server 16 can monitor the abnormal situation AS that has occurred using the vehicles 110 parked around the occurrence location OL of the abnormal situation AS by executing the flow shown in FIG. 4 or FIG. 7.

In this case, the processor 18 may transmit the detection command C1 to the vehicles 110 parked around the parking lot 100 in step S5 described above. While the present disclosure has been described through the embodiments, the embodiments described above are not intended to limit the claimed disclosure.

What is claimed is:

1. A device that monitors an abnormal situation that has occurred in a region inside or around a parking lot using a vehicle, the device comprising:
   an information acquisition unit that acquires state information representing a state within the region;
   an abnormality detection unit that detects the abnormal situation and specifies an occurrence location of the detected abnormal situation based on the state information; and
   a command transmission unit that transmits a command for activating a vehicle exterior monitoring sensor provided in the vehicle parked around the occurrence location specified by the abnormality detection unit and causing the vehicle exterior monitoring sensor to detect the occurrence location to the parked vehicle.

2. The device according to claim 1, wherein:
   the information acquisition unit acquires, as the state information, image data captured by an infrastructure sensor provided in the parking lot; and
   the abnormality detection unit detects the abnormal situation and specifies the occurrence location based on the image data.

3. The device according to claim 1, further comprising a vehicle specification unit that specifies the parked vehicle of which the vehicle exterior monitoring sensor is to be activated from among the vehicles in the region based on the state information and position information of the vehicles in the region, wherein the command transmission unit transmits the command to the parked vehicle specified by the vehicle specification unit.

4. The device according to claim 3, wherein the vehicle specification unit
   specifies a parking position of the vehicle in the region based on the state information or the position information, and
   specifies the parked vehicle provided with the vehicle exterior monitoring sensor that captures the occurrence location within a detection range based on the specified parking position from among the vehicles within the region.

5. The device according to claim 4, wherein the vehicle specification unit
   further specifies an orientation of the vehicle in the region based on the state information or the position information, and
   specifies the parked vehicle further based on the specified orientation.

6. The device according to claim 1, wherein the information acquisition unit further acquires, as the state information, detection data detected by the vehicle exterior monitoring sensor in accordance with the command transmitted by the command transmission unit.

7. A vehicle provided with a vehicle exterior monitoring sensor, wherein the vehicle exterior monitoring sensor is activated and is caused to detect an occurrence location in accordance with a command transmitted by a command transmission unit of a device that monitors an abnormal situation that has occurred in a region inside or around a parking lot using the vehicle, wherein the device further comprises:
   an information acquisition unit that acquires state information representing a state within the region;
   an abnormality detection unit that detects the abnormal situation and specifies the occurrence location of the detected abnormal situation based on the state information; and
   the command transmission unit that transmits the command for activating the vehicle exterior monitoring sensor provided in the vehicle parked around the occurrence location specified by the abnormality detection unit and causing the vehicle exterior monitoring sensor to detect the occurrence location to the parked vehicle.

* * * * *